US005740509A

United States Patent [19]

Hibi et al.

[11] Patent Number: 5,740,509

[45] Date of Patent: Apr. 14, 1998

[54] MAGNET ROLLER AND DEVELOPING DEVICE

[75] Inventors: Takashi Hibi; Takeo Shoji; Gaku Konishi, all of Yokohama, Japan

[73] Assignee: Canon Kabushiki Kaisha, Tokyo, Japan

[21] Appl. No.: 499,124

[22] Filed: Jul. 7, 1995

[30] Foreign Application Priority Data

Jul. 8, 1994 [JP] Japan .................................... 6-179784

[51] Int. Cl.[6] .................................................... C03G 15/09

[52] U.S. Cl. .............................................................. 399/277

[58] Field of Search .................................... 355/251, 253, 355/245; 118/657, 658; 399/277

[56] References Cited

U.S. PATENT DOCUMENTS

| | | | |
|---|---|---|---|
| 4,166,263 | 8/1979 | Harada et al. | 335/284 |
| 4,557,582 | 12/1985 | Kan et al. | 399/277 |
| 4,823,689 | 4/1989 | Kishino et al. | 100/155 R |
| 4,872,418 | 10/1989 | Yoshikawa et al. | 118/657 |
| 5,384,957 | 1/1995 | Mohri et al. | 29/895.32 |
| 5,469,245 | 11/1995 | Aoshima et al. | 355/251 |
| 5,488,341 | 1/1996 | Yamamoto et al. | 355/302 |

FOREIGN PATENT DOCUMENTS

| | | |
|---|---|---|
| 0 549 400 A2 | 6/1993 | European Pat. Off. . |
| 60-59377 | 5/1985 | Japan . |
| 61-32079 | 2/1986 | Japan . |
| 61-115303 | 6/1986 | Japan . |
| 3-189667 | 8/1991 | Japan . |
| 2 201 360 | 9/1988 | United Kingdom . |

OTHER PUBLICATIONS

Patent Abstracts of Japan, vol. 9, No. 190 (P–378) [1913 ], Aug. 7, 1985, relating to JP 60–59377, published Apr. 5, 1985.

Patent Abstracts of Japan, vol. 10, No. 188, (P473) [2244 ], Jul. 3, 1986, relating to JP 61–32079, published Feb. 14, 1986.

Patent Abstracts of Japan, vol. 10, No. 302 (E–445), Oct. 15, 1986, relating to JP 61–115303, published Jun. 2, 1986.

Patent Abstracts of Japan, vol. 15, No. 449 (P–1275), Nov. 14, 1991, relating to JP 3–189667, published Aug. 19, 1991.

*Primary Examiner*—William J. Royer

*Attorney, Agent, or Firm*—Fitzpatrick, Cella, Harper & Scinto

[57] ABSTRACT

A magnet roller including a columnar magnet with a through bore having a cross-section defining a thickness of the columnar magnet which is uneven along a circumference thereof, wherein a most thick portion of the columnar magnet has a strongest magnetic pole. The columnar magnet may be made from a resin material containing a magnetic powder. The bore cross-section may be non-circular, D-shaped, or rectangular. An insertion member may be inserted into the through bore to fixedly support the magnet roller.

11 Claims, 3 Drawing Sheets

MAGNET ROLLER AND DEVELOPING DEVICE

FIELD OF THE INVENTION AND RELATED ART

The present invention relates to a developing device for developing an electrostatic image on an image bearing member and a magnet roller usable for such a developing device.

In an image forming apparatus using an electrophotographic type process, an electrostatic latent image formed on a surface of an image bearing member, such as a photosensitive member, is visualized with a developer by a developing device, the visualized image is transferred onto a recording paper from the image bearing member by a transfer device, the transferred image is fixed by a fixing device, and finally the recording paper is discharged from the image forming apparatus.

The developing device in the image forming apparatus comprises a developer carrying member extended close to an in parallel with the image bearing member, a magnet roller disposed in the developer carrying member, a developer and developer layer thickness regulation member for regulating the amount of developer on the developer carrying member.

Usually, the developer is one component developer using magnet toner or two component developer containing magnetic carrier and non-magnetic toner. In order to carry the developer on the developer carrying member surface and to feed it to the neighborhood of the image bearing member, the developer carrying member is in the form of a sleeve rotatable relative to a magnet roller which is stationary therein. A magnet roller usable with such a developing apparatus is produced by extruding a mixture of resin material and magnetic powder and then magnetizing it. The roller then is mounted on a metal shaft. In another example, a shaft and magnet portions composed of the same material are injection molded, and the roller is magnetized (integral type).

In both of the cases, the shaft portions at the opposite ends of the magnet roller are thinnest, and at least one of the ends is formed into a non-circular shape, i.e., square or D-shaped, to permit engagement and support.

When the size of the magnet roller is reduced, the following problems arise.

In the case of a roller including the magnets mounted around a metal shaft, the magnet portions are too small to provided a desired magnetic force. When the magnetic force is insufficient, a foggy background tends to be produced on the image.

Particularly, an opposite magnetic pole relative to the image bearing member, is required to be a stronger magnetic pole than the other poles. This requires that the size of the magnet roller is determined by this largest magnet, so that the desired downsizing is limited.

In the integral shaft type, the mechanical strength of the shaft portion is low because of the property of material (resin), and therefore, it is relatively easily broken.

In a conventional type having a shaft, erroneous mounting is liable to occur upon assembling it into the developing device. Therefore, as described above, the cross-sectional configuration of the end portion is made D-shaped, for example. In this case, the position of the magnet has to be aligned to the desired magnetic pole position in the rotational direction of the shaft.

Upon downsizing of the magnet roller, there is a tendency to decrease the magnetic force, with the result that developer leakage tends to occur in the developing device, as described above.

SUMMARY OF THE INVENTION

It is a principal object of the present invention to provide a small diameter magnet roller having sufficient strength at the supporting portion.

It is another object of the present invention to provide a magnet roller having a small diameter with high magnetic force.

According to an aspect of the present invention, there is provided a magnet roller comprising a columnar magnet; a through bore having a cross-section proving a thickness of the columnar magnet which is uneven along a circumference thereof; wherein a most thick portion of said columnar magnet has a strongest magnetic pole.

According to another aspect of the present invention, there is provided a developing apparatus comprising a developer container for containing a developer; a developer carrying member for carrying the developer; a magnet roller in said developer carrying member, said magnet roller comprising a columnar magnet a through bore having a cross-section proving a thickness of the columnar magnet which is uneven along a circumference thereof; and an insertion supporting member inserted into the through bore to fixedly supporting the magnet roller.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1(*b*) is a partially sectional view of a developing device according to an embodiment of the present invention.

FIG. 2(*b*) is a sectional view of an image forming apparatus according to an embodiment of the present invention.

FIG. 3(*c*) is a perspective view of the magnet roller of FIGS. 3(*a*) and 3(*b*).

DESCRIPTION OF THE PREFERRED EMBODIMENT

Figure 1A:
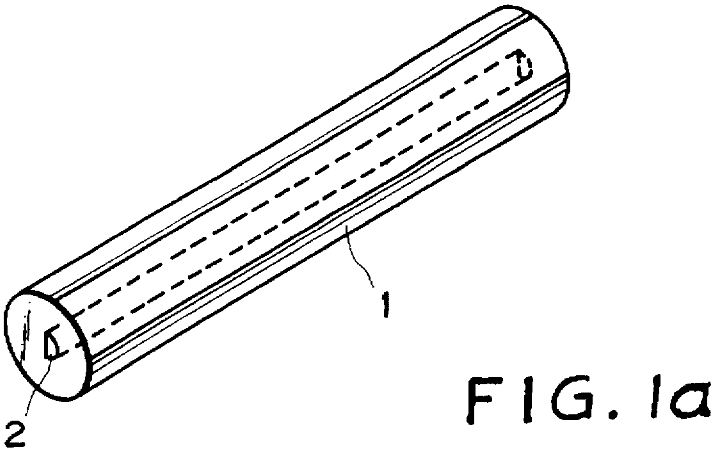
FIG. 1(*a*) is a a perspective view of a magnet roller according to an embodiment of the present invention.
Figure 1B:
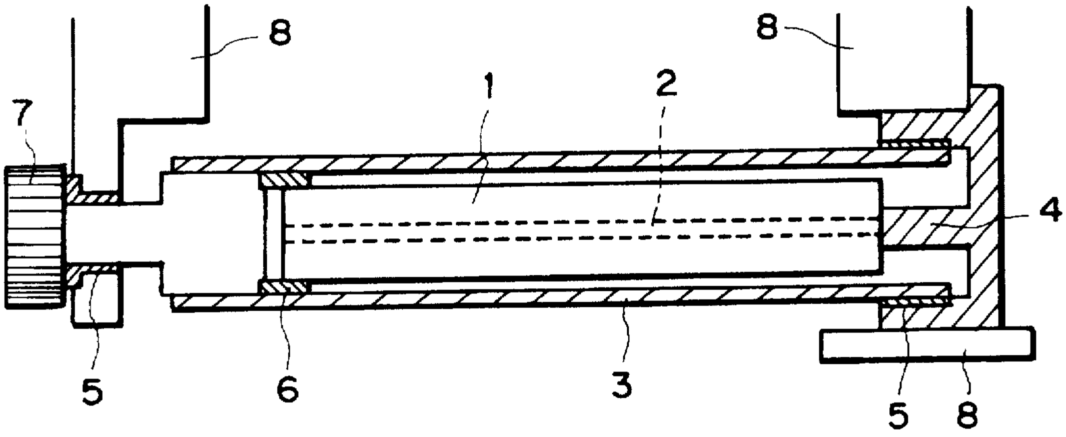

Referring to FIGS. 1(*a*) and (*b*), a first embodiment of the present invention will be described.

FIG. 1(*a*) is a perspective view of the magnet roller in the first of embodiment.

Magnet roller 1 in this embodiment, as shown in FIG. 1(*a*), is of columnar shape having a D-shape through bore or hole 2. Magnet roller 1 is produced by extrusion molding a mixture (magnetic material) of a magnetic powder and a binder, such as resin material, rubber or the like. Two to eight parallel longitudinal poles are formed by magnetization with alternating polarities in the circumferential direction.

A supporting shaft or other shaft for the magnet roller 1 is formed of the same material and of the same cross-section over the entire length.

The thus constructed magnet roller 1 is supported on the developing device as shown in FIG. 1(*b*). The developer carrying member 3 is fixed to the driving gear 7, which constitutes rotation transmission means, and which is supported on bearing 5 and therefore rotatable. The magnet roller 1 is fixed to the developing device by engagement between the D-shaped through-hole 2 of a magnet roller 1 and the projection of the supporting member 4, which is fixed on the developing device frame 8, and which integrally supports bearing 5 for the developer carrying member 3.

As regards the driving gear 7 side, the sliding contact member 6 is provided between the inside of the developer carrying member 3 and the magnet roller 1 to support it smoothly so as to prevent vibration of the magnet roller 1 due to rotation of the developer carrying member 3. Therefore, the magnet roller 1 and the developer carrying member 3 are kept from contact with each other.

In this embodiment, the cross-sectional configuration of the through-hole 2 of the magnet roller 1 is not radially-symmetrically engageable with the supporting member 4, so that the magnet roller 1 can be reliably and easily fixed to the developing device, and the orientation can be easily assured to permit correct positioning of the poles.

The extension portion of the supporting member 4 of the magnet roller 1 (indicated by reference numeral 4 in FIG. 1) is smaller than the diameter of the magnet roller 1 except for the engaging portion, and the total length thereof is shorter than the total length of the developer carrying member 3.

In this manner lateral leakage of developer at the region of the developer carrying member 3 can be prevented. Because of the structure of the supporting member 4, the diameter of the magnet roller 1 can be maximized relative to the inside diameter of the developer carrying member 3, and therefore, sufficient magnetic force can be provided. Engagement or locking can be made firmer by using a magnetic member such as iron for the supporting member 4 for the magnet roller 1.

As described above, the magnet roller 1 is columnar and has a non-radially-symmetrical through-hole, and therefore, is a small size magnet roller without a shaft or a supporting shaft. The total length of the magnet roller 1 is made shorter than the total length of the developer carrying member 3, and the outer diameter of the upper portion of the extension of the magnet roller 1 except for the engaging portion of the supporting member 4 of the magnet roller 1 is made smaller than the outer diameter of the magnet roller 1. Therefore, leakage of the developer can be prevented, and the roller can be downsized, to produce a low cost magnet roller 1 without any unnecessary portion. The outer diameter of the magnet roller 1 is minimized so that even when the same magnetic force as in conventional device is desired, the size of the developer carrying member 3 and the size of the developing device can be reduced. The molding or manufacturing method described above is not limiting, and another method is usable.

Figure 2A:
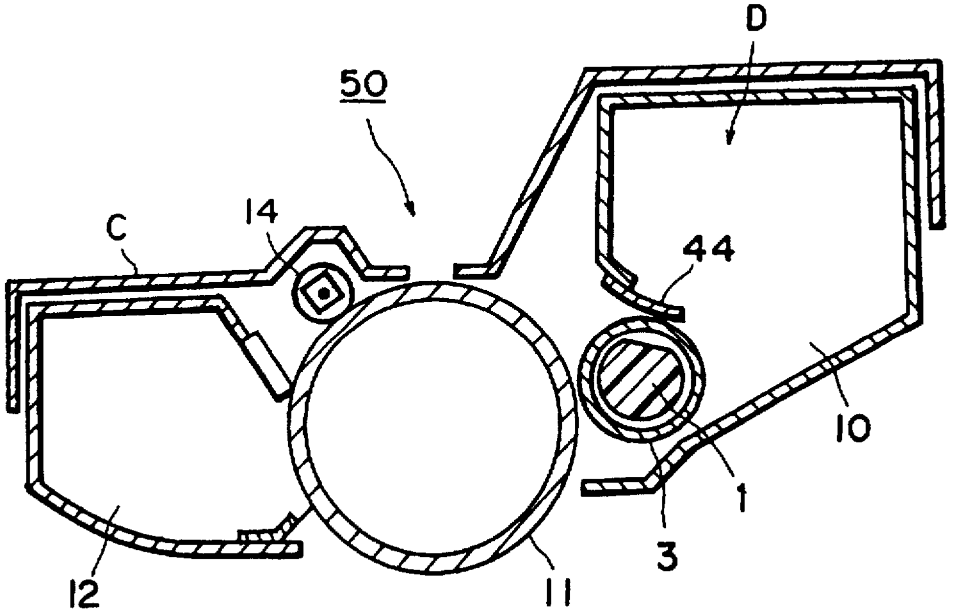
FIG. 2(*a*) is a sectional view of a process cartridge using a magnet roller type developing device according to an embodiment of the present invention.
Figure 2B:
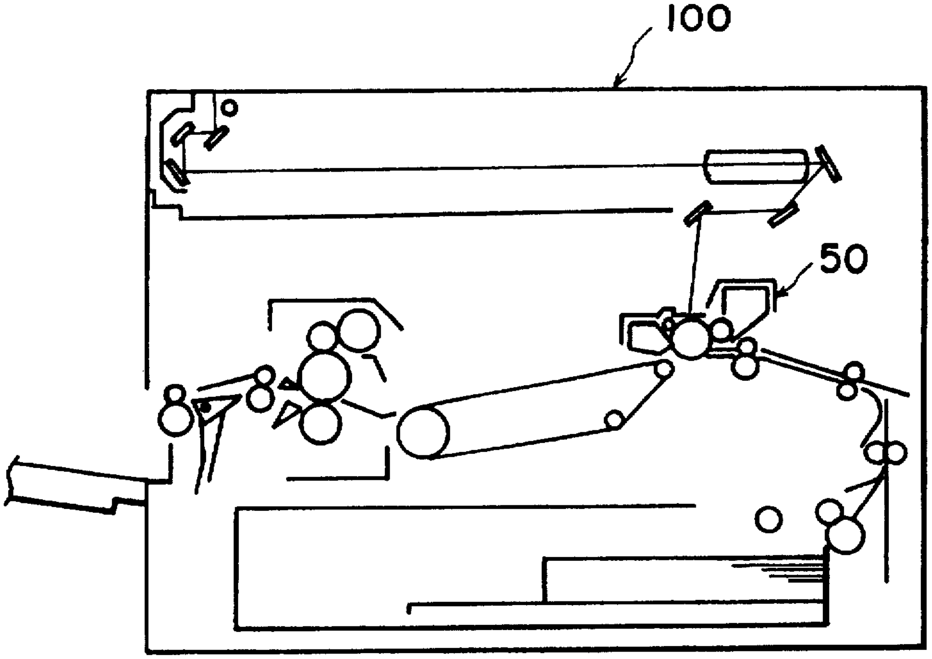

FIG. 2 shows a second embodiment of the present invention.

In this embodiment, the above-described magnet roller 1 is applied to a process cartridge detachably mountable to a main assembly of an image forming apparatus such as a copying machine or printer.

FIG. 2(*a*) is a sectional view of the process cartridge.

The developing device D comprises a developer accommodation portion 10, constituting developer supply means, a developer layer thickness regulation member 44, a magnet roller 1 and a developer carrying member 3. The process cartridge 50 is constituted by the developing device D, an image bearing member 11, a cleaning device 12, a charging device 14 and a cover C, as a unit.

FIG. 2(*b*) is a view when the process cartridge 50 is mounted on a main assembly 100 of the image forming apparatus. A device such as a process cartridge detachably mountable relative to image forming apparatus main assembly is desirably small in size, and therefore, the magnet roller 1 of this invention is particularly preferred in this case.

Figure 3A:
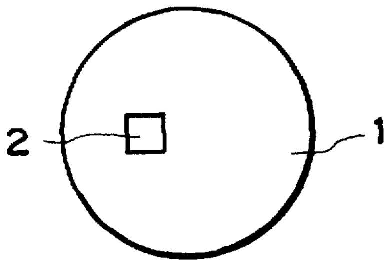
FIGS. 3(*a*) and 3(*b*) are a sectional views of a magnet roller according to an embodiment of the present invention.
Figure 3B:
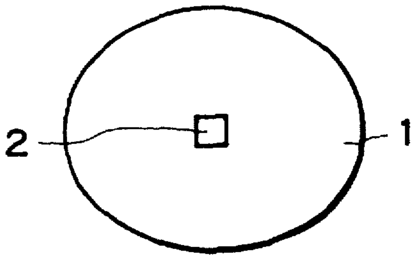
Figure 3C:
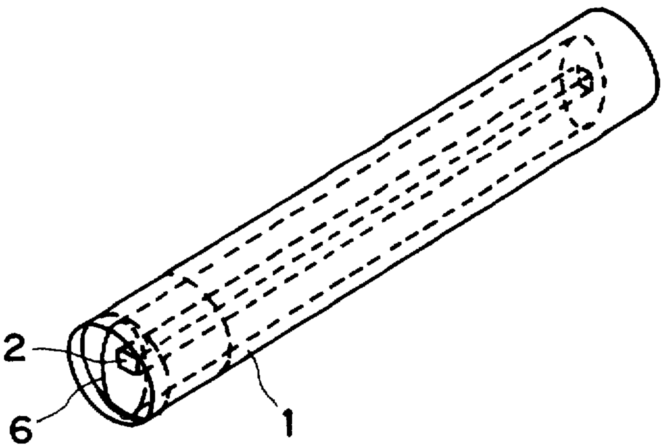

Referring to FIGS. 3(*a*) to 3(*c*), a third embodiment of the present invention will be described. The same reference numerals as in embodiment 1 are assigned to elements having corresponding functions, and detailed descriptions thereof are omitted for simplicity.

The magnet roller 1 has a different cross-section, as shown in FIGS. 3(*a*) to 3(*c*). In the first embodiment, a through-hole of D-shape is provided substantially at a circular the circle of cross-section. However, in this embodiment, a through-hole is formed so as to provide non-uniform thickness of the magnetic material portion around the hole.

In FIG. 3(*a*), the internal through-hole 2 is eccentric relative to the center of the outer circular surface. In this manner, a larger thickness portion and a smaller thickness portion are provided. The larger thickness portion can be given a strong magnetic force. This larger thickness portion can be magnetized as the development pole which is facing the image bearing member 11 and which requires a stronger magnetic force, by which the cross-sectional area can be minimized, thus permitting reduction of weight and cost.

Also, in this embodiment, the through hole is not necessarily a rotationally-asymmetrical shape. It may be a square, as shown in FIG. 3(*a*). This is advantageous in that, if an attempt is made to engage it with the supporting member 4 with 90 degrees deviation from the correct angular position, then the magnet roller 1 and the developer carrying member 3 will interfere with each other, so that erroneous engagement is prohibited.

Alternatively, as shown in FIG. 3(*b*), the outer periphery of the magnet roller 1 can be made non-circular, i.e., oval in cross-section. With this shape, equivalent advantageous effects are provided. In the case that it is supported in the developer carrying member 3 as as in the first embodiment, a sliding member 6 is mounted on the outer periphery of the magnet roller 1 to provide a circular outer sliding surface, as shown in FIG. 3(*c*).

As described in the foregoing, the cross-section of the magnet roller 1 is made rotational-asymmetrical or irregular, and the thickness difference is made to correspond to the strength of the magnetic pole, by which the cross-sectional area of the magnet roller 1 can be minimized so that the cost and weight thereof can be reduced.

While the invention has been described with reference to the structures disclosed herein, it is not confined to the details set forth and this application is intended to cover such modifications or changes as may come within the purposes of the improvements or the scope of the following claims.

What is claimed is:

1. A magnet roller comprising:

a columnar including a through bore extending longitudinally end-to-end within said columnar magnet having a cross-section defining a thickness of said columnar magnet which is uneven along a circumference thereof such that the thickness is at a maximum only at one position;

wherein said columnar magnet has a plurality of magnetic poles having different magnetic strengths arranged in the circumferential direction and wherein the maximum thickness portion of said columnar magnet has a strongest magnetic pole of the plurality of magnetic poles.

2. A magnet roller according to claim 1, wherein said through bore has a non-circular cross-section.

3. A magnet roller according to claim 2, wherein said through bore has a D-shaped cross-section.

4. A magnet roller according to claim 2, wherein said through bore has a rectangular cross-section.

5. A magnet roller according to claim 1, wherein said columnar magnet is composed of resin material containing magnetic powder.

6. A developing apparatus comprising:

a developer container for containing a developer;

a developer carrying member for carrying developer thereon;

a magnet roll comprising a columnar magnet including a through bore extending longitudinally end-to-end within said columnar magnet having a cross-section defining a thickness of said columnar magnet which is uneven along a circumference thereof such that the thickness is at a maximum only at one position, wherein said columnar magnet has a plurality of magnetic poles having different magnetic strengths arranged in the circumferential direction, wherein the maximum thickness portion of said columnar magnet has a strongest magnetic pole of the plurality of magnetic poles; and an insertion supporting member inserted into said through bore to fixedly support said magnet roller.

7. An apparatus according to claim 6, further comprising an outer supporting member at an end opposite from said insertion supporting member.

8. An apparatus according to claim 6, wherein the strongest magnetic pole is a developing magnetic pole provided at a developing zone where said developer carrying member is opposed to an image bearing member for bearing an electrostatic image.

9. An apparatus according to claim 6, wherein said through bore has a non-circular cross-section.

10. An apparatus according to claim 9, wherein said through bore has a D-shaped cross-section.

11. An apparatus according to claim 9, wherein said through bore has a rectangular cross-section.

* * * * *

UNITED STATES PATENT AND TRADEMARK OFFICE

CERTIFICATE OF CORRECTION

PATENT NO. : 5,740,509

DATED : April 14, 1998

INVENTOR(S) : HIBI ET AL.

It is certified that error appears in the above-indentified patent and that said Letters Patent is hereby corrected as shown below:

Column 1

Line 21, "an" should read --and--.
Line 47, "the" (second occurrence) should be deleted.
Line 49, "provided" should read --provide--.

Column 2

Line 36, "a a" should read --a--.

Column 4

Line 16, "at" should read --at the center of--.
Line 17, "the circle of" should be deleted.
Line 41, "as as" should read --as--.
Line 58, "columnar" should read --columnar magnet--.

Column 5

Line 17, "roll" should read --roller--.

Signed and Sealed this

Eighth Day of December, 1998

Attest:

Bruce Lehman

BRUCE LEHMAN

*Attesting Officer*

*Commissioner of Patents and Trademarks*